(No Model.)

E. WESTON.
SAFETY DEVICE FOR ELECTRIC CIRCUITS.

No. 259,615. Patented June 13, 1882.

Attest:
R. F. Barnes
W. Frisby

Inventor:
Edward Weston
by his Attorney: Parker W. Page.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

SAFETY DEVICE FOR ELECTRIC CIRCUITS.

SPECIFICATION forming part of Letters Patent No. 259,615, dated June 13, 1882.

Application filed January 10, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Safety Devices for Electric Circuits, of which the following is a specification, reference being had to the drawings accompanying and forming a part of the same.

The safety devices employed with electric circuits or in branches thereof for preventing an abnormal flow of current and the injurious consequences resulting therefrom have usually consisted of a short strip or coil of fine copper, platinum, or other wire inserted in the circuit. This is fused by a marked excess in the amount of current flowing, and the circuit by this means disrupted. Any wood-work or other combustible material, however, which may happen to be in proximity to these wires is likely to be disfigured or injured by the intense heat of fusion, while similar accidents are likely to occur from the falling globules of metal.

The object of my present invention is to preclude the possibility of these occurrences, and to produce a safety device adapted to be affected by an abnormal increase in the current flowing, and thereby disrupt the circuit before any injury can be done.

To this end the invention consists broadly in the combination, with a severed electric circuit, of a fluid-conducting medium of higher resistance than the remainder of the circuit and a retaining device composed of a highly-fusible substance, which maintains the continuity of the circuit through the said fluid-conducting medium until by a definite increase in temperature in the latter the fusible substance is melted. This may be effected in a number of ways. That, however, which I have adopted as the most practicable and simple is to introduce into the circuit a small column of mercury contained in a tube of paraffine-wax or similar substance. The mercury under these conditions is heated by an abnormal increase in the flow of the current, melts the tube, and runs out, thus breaking the continuity of the circuit.

In the accompanying drawings two devices of this character, differing only in shape, are shown.

Figure 1:
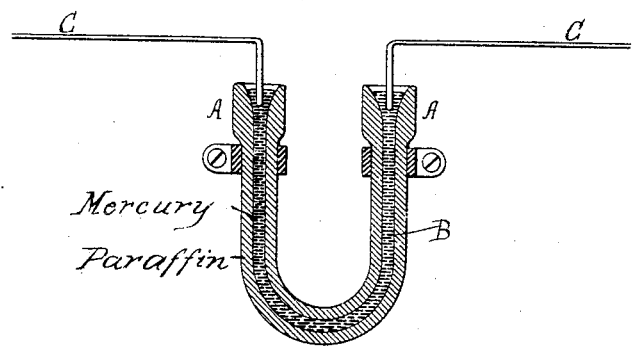
Figure 2:
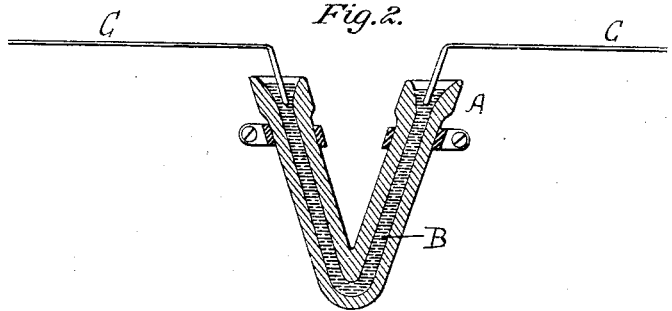

Figure 1 is a section of a U-shaped tube; Fig. 2, a section of a tube formed in V shape.

The tube A is made of paraffine-wax, shellac, or any similar substance which melts at a comparatively low temperature. It may be in the shapes shown, or in any other that is found most convenient, and is to be filled with a column of mercury, B, and secured in any proper manner to a support. The ends of the line-wires C C are caused to dip into the opposite ends of the column of mercury. This device may be included in a main circuit or in any branch thereof, such changes being made in its size and shape as the well-understood conditions of the case may require. Upon an abnormal increase in the flow of current the mercury, which offers a higher resistance than the conductors, becomes heated and melts the fusible casing by which it is inclosed, and runs out.

A receptacle may be used with the tube, if so desired, to catch the drops of melted wax and the escaping mercury.

It is evident that the principle involved in this application may be carried out in a number of ways analogous to that described. For instance, the retaining-case may be partly composed of fusible substance and partly of any other, the fusible section being inserted in such position as to allow the mercury to run out when heated to a sufficient degree to melt the fusible part.

What I claim is—

1. The combination, with an electric circuit, of a fluid-conducting medium having a higher relative resistance than the conductors of the circuit, and a retaining-case composed partly or wholly of highly-fusible material, substantially as described.

2. The combination, with an electric circuit, of a column of conducting-liquid of higher relative resistance than the conductors of the circuit, and an inclosing tube or casing of highly-fusible material, substantially as described.

In testimony whereof I have hereunto set my hand this 3d day of January, 1882.

EDWARD WESTON.

Witnesses:
W. FRISBY.
PARKER W. PAGE.